(12) United States Patent
Pang et al.

(10) Patent No.: US 6,496,334 B1
(45) Date of Patent: Dec. 17, 2002

(54) DATA STORAGE AND RETRIEVAL APPARATUS WITH THIN FILM READ HEAD HAVING PLANARIZED EXTRA GAP AND SHIELD LAYERS AND METHOD OF FABRICATION THEREOF

(75) Inventors: Song Pang, Fremont, CA (US); Lijun Tong, Fremont, CA (US); Zi-Wen Dong, Union City, CA (US); Kevin Lin, San Ramon, CA (US); Joyce Hsiang, San Ramon, CA (US)

(73) Assignee: Read-Rite Corportion, Fremont, CA (US)

( * ) Notice: Subject to any disclaimer, the term of this patent is extended or adjusted under 35 U.S.C. 154(b) by 0 days.

(21) Appl. No.: 09/579,663

(22) Filed: May 26, 2000

(51) Int. Cl.⁷ .................................................. G11B 5/39
(52) U.S. Cl. ......................................................... 360/319
(58) Field of Search ................................... 360/317–319

(56) References Cited

U.S. PATENT DOCUMENTS

| | | | |
|---|---|---|---|
| 4,636,897 A | 1/1987 | Nakamura et al. | |
| 4,666,554 A | 5/1987 | De Wilde et al. | |
| 4,771,349 A | 9/1988 | Tsang | |
| 4,807,073 A | 2/1989 | Takeura et al. | |
| 4,881,143 A | 11/1989 | Bhattacharyya et al. | |
| 4,947,541 A | 8/1990 | Toyoda et al. | |
| 4,971,896 A | 11/1990 | Kawabe et al. | |
| 5,018,037 A | 5/1991 | Krounbi et al. | |
| 5,079,035 A | 1/1992 | Krounbi et al. | |
| 5,206,590 A | 4/1993 | Dieny et al. | |
| 5,349,745 A | 9/1994 | Kawabe et al. | |
| 5,363,265 A | 11/1994 | Hsie et al. | |
| 5,434,826 A | 7/1995 | Ravipati et al. | |
| 5,462,637 A | 10/1995 | Thiele | |
| 5,492,720 A | 2/1996 | Gill et al. | |
| 5,508,866 A | 4/1996 | Gill et al. | |
| 5,527,726 A | 6/1996 | Possin et al. | |
| 5,568,335 A | 10/1996 | Fontana et al. | |
| 5,608,593 A | 3/1997 | Kim et al. | |
| 5,637,235 A | 6/1997 | Kim et al. | |
| 5,646,805 A | 7/1997 | Shen et al. | |
| 5,664,316 A | 9/1997 | Chen et al. | |
| 5,668,688 A | * 9/1997 | Dykes et al. | ................ 360/113 |
| 5,669,133 A | 9/1997 | George | |
| 5,721,008 A | 2/1998 | Huang et al. | |
| 5,729,410 A | 3/1998 | Fontana, Jr. et al. | |
| 5,739,988 A | 4/1998 | Gill | |
| 5,739,990 A | 4/1998 | Ravipati et al. | |
| 5,742,459 A | 4/1998 | Shen et al. | |
| 5,748,416 A | 5/1998 | Tobise et al. | |
| 5,754,376 A | 5/1998 | Kobayashi et al. | |
| 5,805,389 A | 9/1998 | Saito et al. | |
| 5,828,530 A | 10/1998 | Gill et al. | |
| 5,889,640 A | 3/1999 | Hayashi et al. | |
| 5,898,547 A | 4/1999 | Fontana, Jr. et al. | |
| 5,898,548 A | 4/1999 | Dill et al. | |
| 5,898,549 A | 4/1999 | Gill | |
| 5,978,182 A | 11/1999 | Kanai et al. | |

* cited by examiner

*Primary Examiner*—George J. Letscher

(57) ABSTRACT

In at least one embodiment, the apparatus of the invention is a read sensor comprising a shield, a sensor element, an extra shield between the shield and the sensor element, an extra gap between the shield and the sensor and adjacent the extra shield, and a gap layer between the sensor element and the extra shield. The sensor element is positioned in a sensor layer. With the extra shield adjacent to the sensor element and separated by only the relatively thin gap layer, high areal recording density and excellent instability of the sensor element is obtained. At the same time, by fabricating the extra shield to be not significantly wider than the sensor element, the potential for shorting is minimized by placing both the gap and the thicker extra gap between the sensor lead elements and the shield. In at least one embodiment, the method of the invention is for fabricating a read sensor and comprises depositing an extra gap layer onto a shield, removing a portion of the extra gap layer to form a cavity, depositing an extra shield into the cavity, planarizing the extra gap and the extra shield, depositing a gap layer onto the extra gap and the extra shield, and depositing a sensor element onto the gap layer and adjacent to the extra shield.

16 Claims, 5 Drawing Sheets

DATA STORAGE AND RETRIEVAL APPARATUS WITH THIN FILM READ HEAD HAVING PLANARIZED EXTRA GAP AND SHIELD LAYERS AND METHOD OF FABRICATION THEREOF

BACKGROUND

Typical thin film read heads are located between shields. The shields improve head performance by shielding stray magnetic flux from the sensor element. Gap layers electrically insulate the shields from the sensor element and from abutting lead structures.

As read head structures become smaller to improve aerial density, it is desirable to reduce the thickness of the insulative gap layers to optimize head linear density. Although reducing the thickness of the gap layers improves linear density by reducing the distance between the sensor and the shield, it also allows lead structures which are deposited laterally to the sensor element, to more easily short to the shields. Such shorting can be due to flaws in, or degradation of, the gap material, or by defects created during the fabrication process. For example, a pinhole in the gap material can allow current to flow from a lead element to the shield.

Because the sensor-to-shield spacing is not as critical in areas away from the sensor element, it is not necessary to have a thin gap in such areas. As such, to reduce shorting, typically extra gap layers are deposited over the gap layers in areas away from the sensor element. This greatly increases the overall gap thickness in these areas. As a result, a reduction in the occurrence of shorting between the lead structures and the shields is achieved.

An example of such an extra gap structure is shown in FIG. 1. In this device the read head 10 has a shield 20 with extra gap layers 30 placed over the shield 20 about a void 35. Over the extra gap layers 30 and the shield 20 is the first gap layer 40. Then, above the first gap 40 is a sensor layer 50. A cavity 60 is defined by the deformed shape (caused by the void 35) of the sensor layer 50. Although the use of the extra gap layer 30 reduces shorting between the leads 54 of the sensor layer 50 and the shield 20, the present inventors have found such structures difficult to reliably manufacture with submicron track widths. Sub-micron track widths are necessary for high track density applications greater than about 42 Kilo tracks per inch and aerial densities greater than about 20 Giga bits per square inch.

Because of the uneven surface created by laying the first gap layer 40 and sensor layer 50 over the void 35 and the relatively small width W of the cavity 60, variations in the track widths of the sensor element 52 of the sensor layer 50 tend to occur. These track width variations are due to the inherent variations in the width W and depth H of the cavity 60 and the effect the dip of the cavity 60 has on controlling the flow of the photoresist (which tends to pool in the cavity) used to etch the sensor layer 50 and define the track width of the sensor element. In addition, as the thickness of the photoresist is reduced to provide small structures, it is very difficult to adjust the thickness of the photoresist within the cavity 60.

Typically, photoresist thickness is controlled by spinning the workpiece to reduce the depth of the fluid photoresist. As the width of the trench and thickness of the photoresist are reduced, the surface tension of the photoresist tends cause pooling within the trench. This makes the photoresist resistive to any changes in its thickness. Which in turn makes it difficult to control photoresist uniformity across the workpiece and to control the thickness of any small photoresist structure formed within the cavity 60. This lack of thickness uniformity, and the resulting high variation in track width, cause a high rate of loss of devices during manufacture.

An another example of a sensor with increased gap thicknesses at areas away from the sensor, is the sensor disclosed in U.S. Pat. No. 5,568,335, by Fontana, et al., issued Oct. 22, 1996, entitled MULTI-LAYER GAP STRUCTURE FOR HIGH RESOLUTION MAGNETORESISTIVE READ HEAD, herein incorporated by reference in its entirety. In this device, the extra gap layer is deposited over the gap layer lateral to and away from the sensor element. It has been found that this type of structure is also difficult to reliably manufacture with submicron track widths. Therefore, such structures, while improving reliability of the read heads, prove to be an impediment to obtaining high aerial densities.

One approach to solve the problems associated with the use of an extra gap material, involves etching the shield on either side of the sensor location so to receive a later deposited extra gap layer. This approach is advantageous as it avoids a deformed sensor layer by providing a relatively flat and smooth surface for the application of the sensor layer. An example of this approach is disclosed in U.S. patent application Ser No. 09/325,104 by Knapp, et al., Filed: Jun. 3, 1999, entitled DATA STORAGE AND RETRIEVAL APPARATUS WITH THIN FILM READ HEAD INSET EXTRA GAP INSULATION LAYER AND METHOD OF FABRICATION, herein incorporated by reference in its entirety. Although this approach significantly reduces the variations in track widths associated with the prior methods, some measure of sensor to shield shorting still may still occur. This shorting is typically due to the fencing of material at the edges of the extra gap layer. This fencing can cause shorts by providing connections between the shield and the sensor leads.

Therefore, a need exists for a narrow gap read sensor, and method of fabrication thereof, which provides sufficiently small read track widths (e.g. $0.25\mu$–$0.50\mu$), having a minimum of variation in the width over a series of such sensors, and which sensor to shield shorting is significantly reduced or effectively eliminated.

SUMMARY

The present invention provides a thin film read head having planarized extra gap and shield layers and a method of fabrication thereof. The apparatus of the invention is a read sensor which includes a shield, a sensor element, an extra shield positioned between the shield and the sensor element, an extra gap set between the shield and the sensor and adjacent the extra shield, and a gap layer which is located between the sensor element and the extra shield. The sensor element is positioned in a sensor layer.

The extra shield is typically positioned adjacent (e.g. below) the sensor element, with the extra gap positioned about the extra shield and lateral to the sensor element. By making the extra shield somewhat wider than the sensor element, the potential for shorting is minimized by placing both the gap and the extra gap, between the majority of the sensor leads, and the shield. At the same time, the linear density of the sensor element is maximized by placing only the thinner gap layer between the sensor element and the extra shield.

In at least one embodiment, variations of the width of sensor element during manufacture are minimized by having the sensor layer substantially planar. This is achieved by positioning the sensor layer upon a substantially planar gap layer. The gap layer in turn is planar as the upper surfaces of the extra gap and extra shield lie substantially in a common plane (the upper surfaces are substantially flat and aligned with one another). Preferably, the extra gap and extra shield are commonly planarized.

Preferably the shield and the extra shield are a plated nickel iron (NiFe) and the extra gap and the gap layer are alumina ($Al_2O_3$). Also, the extra shield and extra gap are each about 1000 Å thick and the gap layer is between about 300 Å thick and about 700 Å thick. Further, the upper surface of the shield is sufficiently rough to substantially prevent delamination of the extra gap from the shield.

In at least one embodiment, the invention includes a data storage and retrieval apparatus which includes a magnetic recording media, a head assembly located adjacent to the magnetic recording media, and a motor coupled to the media so as to move the media with respect to the head assembly. The head assembly in turn includes a write head and a read head. The read head includes a shield, a sensor element, an extra shield set between the shield and the sensor element, an extra gap located between the shield and the sensor and adjacent to the extra shield, and a gap layer positioned between the sensor element and the extra shield.

The method of the invention is for fabricating a read sensor and includes depositing an extra gap layer onto a shield, removing a portion of the extra gap layer to form a cavity, depositing an extra shield into the cavity, depositing a first gap layer onto the extra gap and the extra shield, and depositing a sensor element onto the first gap and adjacent to the extra shield. The method can also include planarizing the extra gap and the extra shield, which is performed before the deposition of the first gap layer.

In at least one embodiment of the method, the step of depositing the sensor element includes depositing a substantially planar sensor layer which includes the sensor element. The first gap layer is deposited to a thickness of between about 300 Å and about 700 Å. Also, the extra gap and extra shield are deposited to a thickness greater than 1000 Å. Preferably, the extra gap is it deposited to a thickness of about 3000 Å and the extra shield to about 2500 Å. After planarizing, the extra gap and the extra shield preferably each have a thickness of about 1000 Å. It is also preferred that the step of planarizing the extra gap and the extra shield is done by a chemical mechanical polish (CMP). The step of removing a portion of the extra gap layer to form a cavity is preferably performed by reactive ion beam etching (RIE). Further, in the preferred embodiment, the shield and the extra shield are a plated nickel iron (NiFe), and the extra gap and the gap layer are alumina ($Al_2O_3$). The upper surface of the shield is preferably sufficiently rough to prevent, or at least sufficiently reduce, delamination of the extra gap from the shield.

DETAILED DESCRIPTION OF THE PREFERRED EMBODIMENTS OF THE INVENTION

Figure 1:
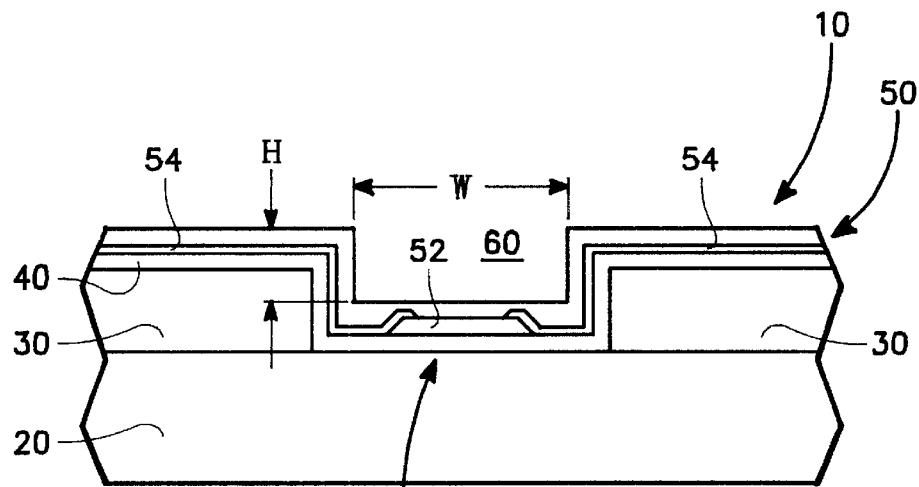
FIG. 1 is a view from the air bearing surface of a partially fabricated read head device.

The present invention is embodied in an apparatus and method of fabrication. The apparatus and method of the invention provide several advantages over the prior art.

One advantage is that by employing a thin insulative layer between the sensor layer and the shield only at the location of the sensor element, the apparatus provides improved instability of the sensor element while reducing or eliminating the possibility of shorting between the sensor layer (leads) and the shield. Because the distance between the sensor element and the shield is reduced, the sensor element can read (sense) reduced sized data bits on the media. Smaller data bits in turn provide increased linear density, hence, areal density of the media, which allows greater storage capacities to be achieved in the same sized, or smaller, hard drives. The possibility of shorting is reduced or eliminated as the apparatus has, located about the sensor element, a thick insulative layer of material separating the sensor layer from the shield. This thick insulating layer prevents or greatly limits shorting due to degradation of the gap material or defects created during the fabrication process.

Another advantage of the present invention is that a sufficient increase in production yield can be achieved by reducing variations in the width of the sensor element (e.g. the track width). That is, a lower standard deviation (sigma) from the mean sensor width is obtained. A lower sigma value results in a reduction of the number of sensors manufactured with track widths outside the allowable tolerances. This reduction in width variance is obtained by configuring the elements of the read sensor so that the sensor layer can be applied upon a substantially flat surface. By doing so, the present invention eliminates the need to deform the sensor layer, as was the case in the prior art where the sensor layer had to be deposited over a cavity. As such, the width of the sensor element is no longer subject to variations in the width and/or depth of a cavity. Further, with the sensor layer laying flat, the problem of bi-layer photoresist pooling is eliminated (a bi-layer photoresist process for reader trackwidth control is disclosed in U.S. patent application Ser No. 09/325,104 by Knapp, et al., Filed: Jun. 3, 1999, entitled DATA STORAGE AND RETRIEVAL APPARATUS WITH THIN FILM READ HEAD INSET EXTRA GAP INSULATION LAYER AND METHOD OF FABRICATION, which as previously noted, is herein incorporated by reference in its entirety).

Still another advantage of the present invention is that there is no shorting due to fencing. Fencing occurred with some prior art devices which used photoresist to etch or mill regions of the shield of the read sensor. In certain circumstances the shield material ejected during milling would collect along the sidewalls of the bi-layer photoresist. When the photoresist was removed incompleted, the collected ejected material would form fences or spike shapes. These fences would on occasion extend far enough up from the shield to pass through the gap layer and contact the sensor lead layers. With the fences contacting the sensor layer, a short would exist and the performance of the sensor would be considerably degraded, the so called instability problem. In contrast, in the present invention the shield is not milled, and therefore there is no fencing or spiking.

One more advantage of the present invention is that the upper surface of the shield layer is sufficiently rough to provide improved adhesion between the shield and the extra gap layer. This reduces or eliminates delamination of the extra gap layer. As such, the production yield of the present invention is further improved.

Preferred Embodiments of the Apparatus of the Invention

In at least one embodiment, the apparatus of the present invention is a read sensor 100 which includes a shield 110, an extra gap 120, an extra shield 130, a gap layer or first gap 140 and a sensor layer 150. These elements are shown in FIG. 2.

The shield 110 operates to shield the read sensor from any stray magnetic flux. The shield 110 is preferably a plated nickel iron (NiFe), however, the shield can be any other of a variety of known materials which also provide sufficient shielding to the sensor. The shield 110 is formed to a thickness of about 2μ inches. The shield 110 includes an upper surface 112. It is preferred that the upper surface 112 is relatively rough so as to provide improved adhesion of the extra gap 120 to the shield 110. In at least one embodiment, the mean roughness of the upper surface 112 is between 100 Å and 200 Å. This improved adhesion acts to eliminate delamination of the extra gap 120 from the shield 110. Which in turn improves wafer yields by lowering the rate of loss of devices during manufacturing.

Figure 2:
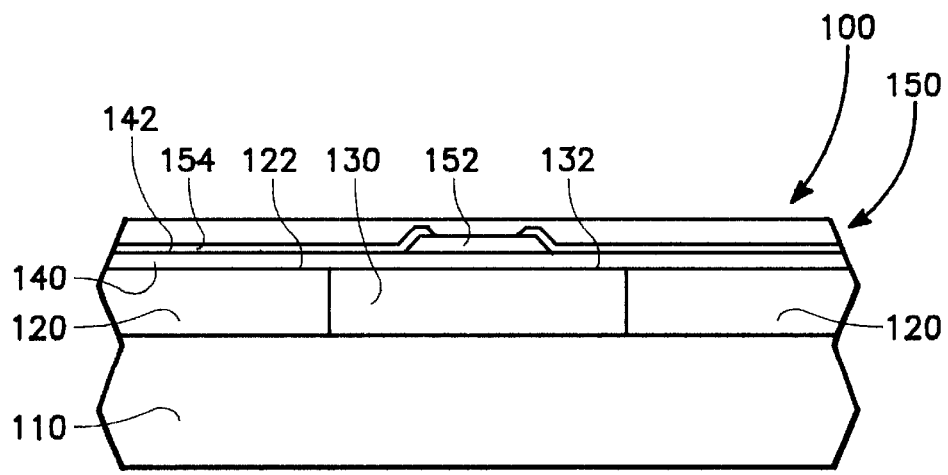
FIG. 2 is a view from the air bearing surface of a partially fabricated read head in accordance with an embodiment of the present invention.

As can be seen in FIG. 2, the extra gap 120 is positioned in two portions over the shield 110. Each portion of the extra gap 120 is positioned on either side of the extra shield 130. The extra gap 120 functions to electrically insulate the shield 110 from the sensor layer 150 and from abutting lead structures. The extra gap 120 preferably has a thickness of about 1000 Å. Although a thickness of 1000 Å for the extra gap 120 is desired, ten percent thicker or thinner is acceptable. The extra gap 120 can be thicker (e.g. 2000 Å), or thinner (e.g. 500 Å), so long as it is sufficiently thick enough to prevent, or greatly limit shorting caused by possible flaws (e.g. pinholes) in, or the degradation of, the gap material. The extra gap 120 can be of any well known insulative material including silicon dioxide, but preferably is alumina ($Al_2O_3$). The extra gap 120 includes an upper surface 122.

The extra shield 130 is positioned above the shield 110 and between the two portions of the extra gap 120. The extra shield 130 is preferably a plated nickel iron (NiFe). However, the extra shield 130 can be any of a variety of known materials which provide sufficient shielding to the sensor. The extra shield 130 preferably has a thickness of 1000 Å. Although a thickness of 1000 Å for the extra shield 130 is desired, ten percent thicker or thinner is acceptable. The extra shield 130 has an upper surface 132 which is substantially aligned with the upper surfaces 122 of each portion of the extra gap 120. It is preferred that the upper surface 132 and the upper surfaces 122 are positioned in a common plane, such that a planarized surface is provided. This allows the first gap 140 and the sensor layer 150 to lie flat, and not to be deformed over a void, as is the case in some prior art sensors. The width of the extra shield 130 can vary depending on the specific type of the sensor element used in the sensor layer 150. However, the extra shield 130 should be at least as wide as the width of the sensor element (e.g. of the track width). In addition, the width of the extra shield 130 should be limited to minimize potential shorting between the shield 110 and the sensor layer 150.

The first gap 140 is positioned across the upper surfaces 122 and 132, as shown in FIG. 2. The first gap 140 has a planar upper surface 142. The first gap 140 functions to optimize head sensitivity by providing an electrically insulative barrier of a minimal thickness, set between a sensor element 152 defined in the sensor material 150 and the extra shield 130. The first gap 140 can be any thickness which provides sufficient insulation while achieving the desired head linear density, namely in the range of 300 Å to 700 Å thick. The thickness of the first gap 140 will vary with the intended use of the device, the higher the desired head areal density the thinner the first gap 140 will be. As with the extra gap, the first gap 140 can be any of the known insulative materials such as silicon dioxide, however, it is preferred that the first gap 140 be Alumina ($Al_2O_3$).

The sensor layer 150 is positioned over the first gap 140. The sensor layer 150 includes a sensor element 152 and leads 154. The sensor element 152 can be any of a variety of sensors, including giant magnetoresistive (GMR), spin-dependent tunneling (SDT), current-in-plane (CIP), current perpendicular to the plane (CPP), or the like. Further, the sensor element 152 can be of any of a variety of configurations, for example, top spin value, bottom spin value, or the like.

By being substantially flat, the sensor layer 150 avoids the cavity shape of the prior art sensor layers (for example, the sensor layer 50, as shown in FIG. 1). The flatness of the sensor layer 150 allows increased control of the thickness of the photoresist layer used for defining the sensor element. This is because the present invention avoids the problem of variable thickness of the photoresist caused by pooling of the photoresist in cavities such as those found in the prior art. Since the thickness of the photoresist directly affects the width of the sensor element 152 created during etching of the sensor layer 150, reductions in variations of the thickness of the photoresist result in reductions in variations in the width of the sensor element 152. Therefore, the flatness of the sensor layer 150 eliminates variations of width and depth of the cavity and thus of the resulting width of the sensor element.

Figure 4:
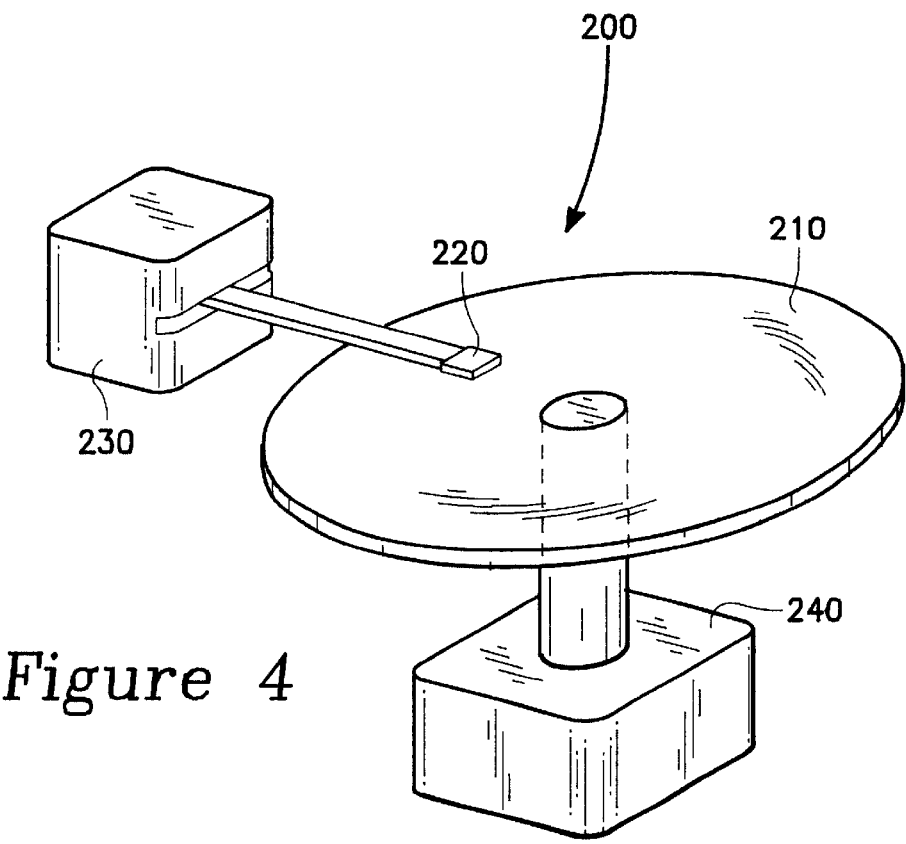
FIG. 4 is a is an isometric view of a data storage and retrieval apparatus in accordance with the present invention.

FIG. 4 shows the read sensor of the present invention embodied in a disk type magnetic data storage and retrieval apparatus 200. The read head of the present invention is located within a merged head assembly 220 which rides above a magnetic storage media 210, depicted in FIG. 4 as a rotatable hard disk type storage media. The hard disk 210 is coupled to a motor 240 to provide rotation of the disk relative to the head assembly 220. An actuating means 230 may be used to position the head assembly 220 above the surface of the media 210 to read and write data, in the form of magnetic bits, from and to the media 210. The data storage and retrieval apparatus 200, typically has several hard disks 210 and several corresponding head assemblies 220.

Preferred Embodiments of the Method of the Invention

In at least one embodiment, the method 300 of the present invention includes the steps of depositing a shield 310, depositing an extra gap layer 320, removing a portion of the extra gap layer 330, depositing an extra shield 340, planarizing the extra gap and the extra shield 350, depositing a first gap layer 360 and depositing a sensor layer 370.

Figure 3A:
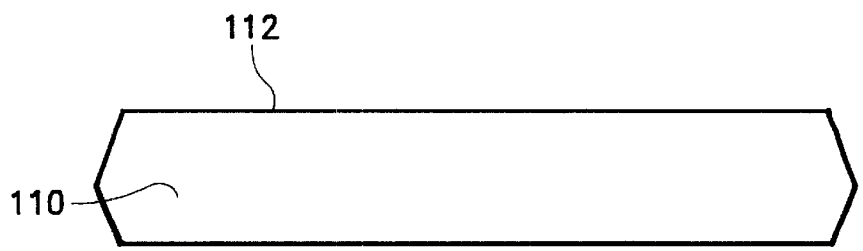
FIGS. 3a–g are views from the air bearing surface showing steps of fabrication in accordance with an embodiment of the present invention.

The first step in the method 300 is the step of depositing a shield 310. This step in shown in FIGS. 3a and 5. In this step a first shield or shield 110 is deposited preferably by any well known electro-plating method or alternatively by any other suitable deposition process. The shield 110 being preferably a plated nickel iron (NiFe). The shield 110 is formed to a thickness of about 2µ inches. The shield 110 is formed to have a relatively rough upper surface 112, such that the upper surface 112 will provide good adhesion to the extra gap 120.

Figure 3B:
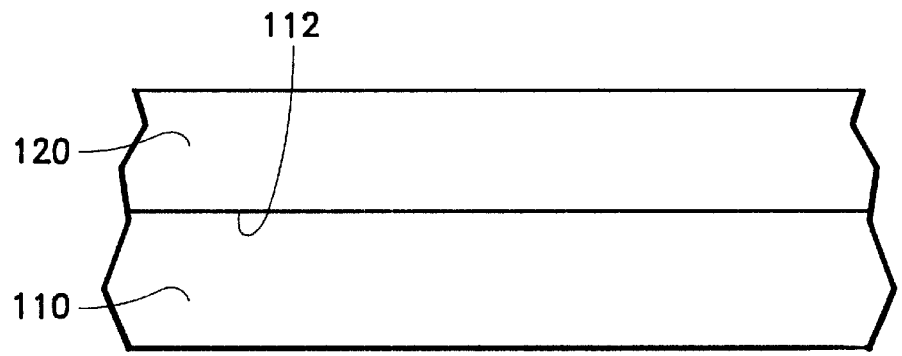
Figure 5:
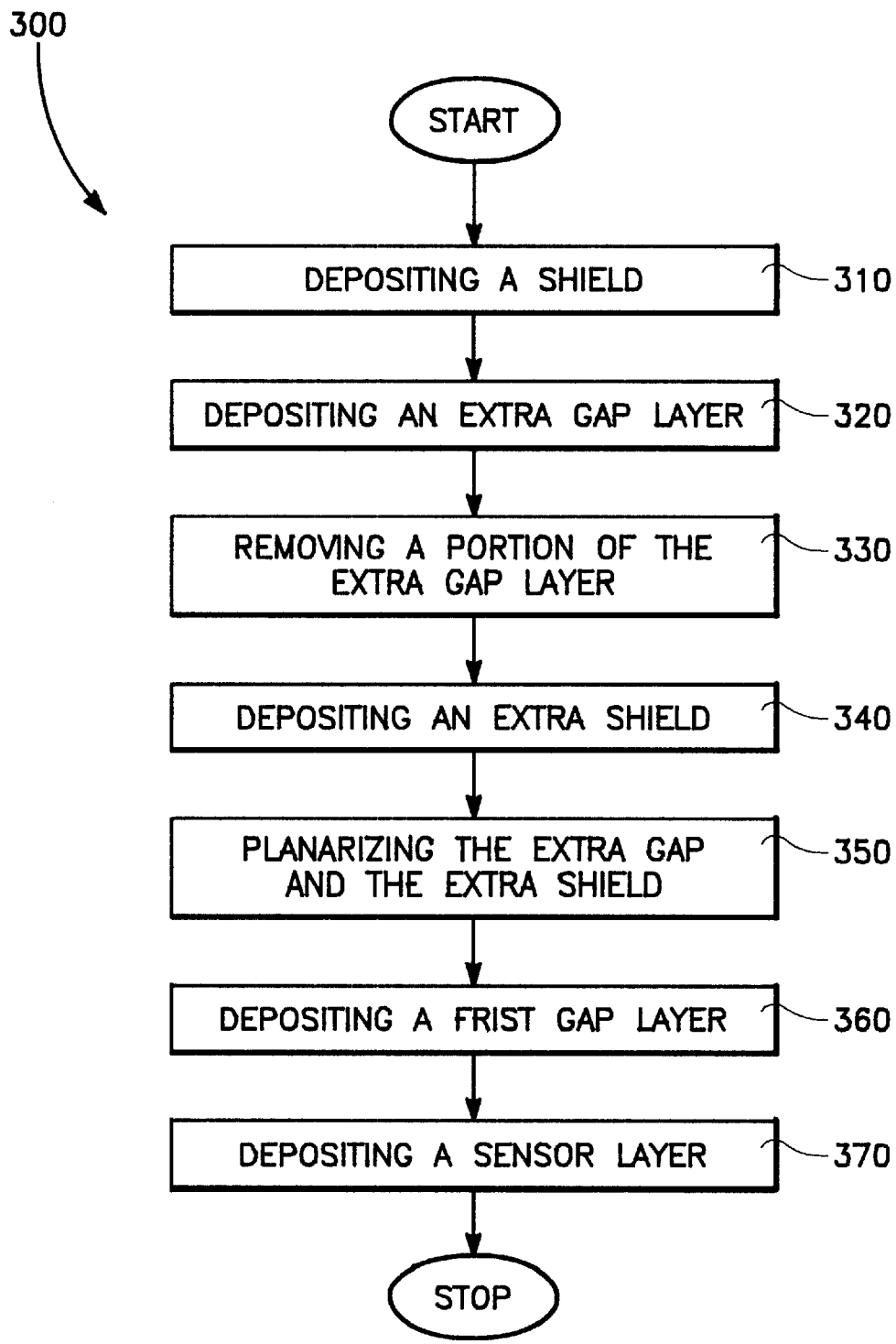
FIG. 5 is a flow chart of a method of fabrication in accordance with an embodiment of the present invention.

The next step in the method 300 is depositing an extra gap layer 320. During this step, the extra gap 120 is deposited over the upper surface 112 of the shield 110. This step is shown in FIGS. 3b and 5. The extra gap can be deposited by any of a variety of well known methods including spinning on the material and sputter deposition. Preferably, the extra gap 120 is deposited to a thickness of about 3000 Å. However, so long as the extra gap 120 is at least greater than 1000 Å thick after the extra gap planarization, its as-deposited thicknesses can vary from the preferred thickness of about 3000 Å.

Figure 3C:
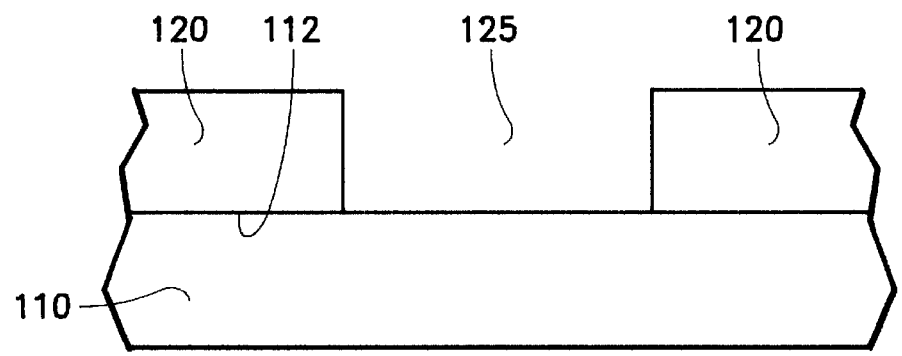
Figure 6:
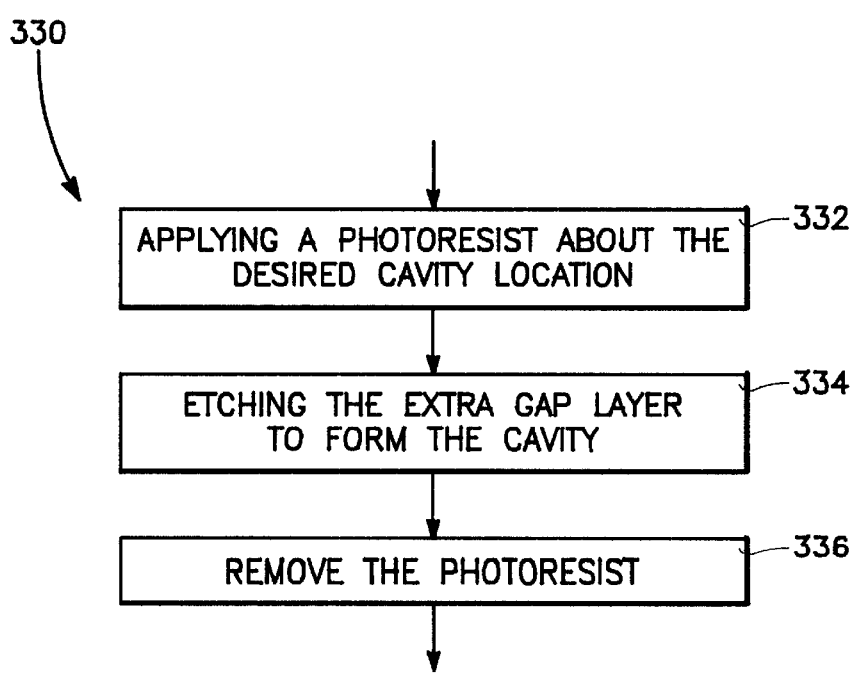
FIG. 6 is a flow chart of a method of fabrication in accordance with an embodiment of the present invention.

Then, the step of removing a portion of the extra gap 330 is performed. As shown in FIGS. 3c and 5, during this step a portion of the extra gap 120 is removed to form a cavity 125. This step is performed by sub-steps including applying a photoresist about the desired cavity location 332, etching the extra gap layer to form the cavity 334 and removing the photoresist 336. These sub-steps are shown in FIG. 6.

The step of applying the photoresist about the desired cavity location 332 can be done by any of a variety of well known methods for applying a photoresist. Further, any of a variety of photoresist structures and lithographic techniques well known in the art can be used during this step, including, single layer resist, bi-layer resists, negative resist, trilayer resist, silated, or others. A specific example of a usable photoresist is PMGI manufactured by Shipley of Massachusetts. Preferably, a single layer photoresist is used. This step can include first applying the photoresist by spinning it onto the surface of the wafer. Next, applying a mask over the photoresist and exposing the photoresist to harden the portions of the photoresist located on either side of the desired location of the cavity 125. Then, applying a developer to remove the unhardened portion of the photoresist above the location of the cavity 125.

Next, the step of etching the extra gap layer to form the cavity 334 is performed. During this step the portion of the extra gap layer 120 at the desired location of the cavity 125 can be etched away by any method well known in the art such as ion milling. However, it is preferred that the extra gap layer is etched by reactive ion beam etching (RIE) to create a straight wall cavity. During the etch, the exposed portion of the gap layer 120 is etched down to the upper surface 112 of the shield 110, creating the cavity 125. Depending on the process and its selectivity, some of the upper portion of the shield 110 might be etched during this step as well.

Then, the photoresist is lifted-off during the step of removing the photoresist 336. The photoresist can be removed by any well known method, including applying a developer to dissolve the photoresist. The result of these sub-steps is shown in FIG. 3c.

Figure 3D:
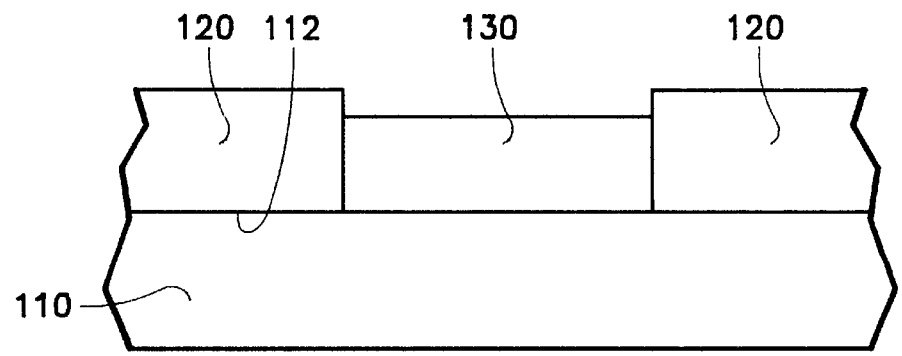

The next step of the method 300 is depositing an extra shield 340. During this step the extra shield 130 is deposited in the cavity 125, as shown in FIG. 3d. Although a variety of known shielding materials can be used for the extra shield 130, it is preferred that the shield be a plated nickel iron permalloy (NiFe). The extra shield 130 can be deposited by any well know deposition method, but it is preferred that the extra shield 130 is deposited by an electro-plating method. During this step, the extra shield 130 is deposited preferably to a thickness of about 2500 Å. Of course, the extra shield 130 can be deposited to a greater or lesser thickness as long as the extra shield 130 is thick enough to allow it to be planarized with the extra gap 120 to their final desired thicknesses, which preferably is 1000 Å.

Figure 3E:
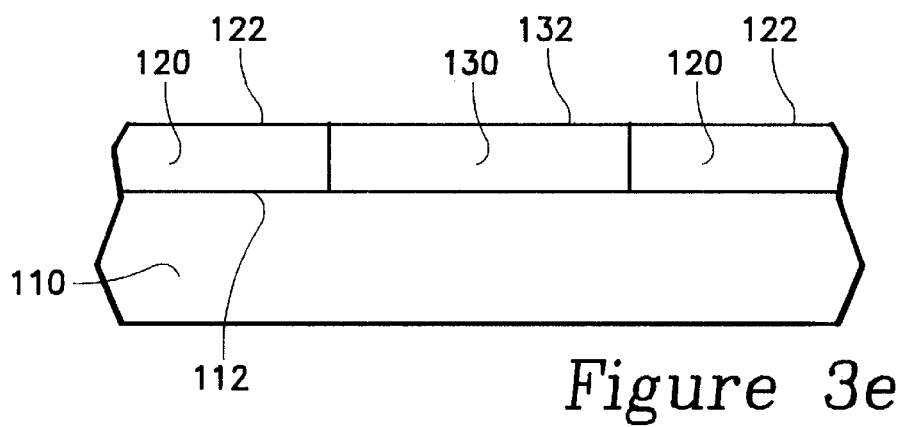

As shown in FIGS. 3e and 5, the next step is planarizing the extra gap and the extra shield 350. During this step the thicknesses of extra gap 120 and the extra shield 130 are both reduced so that the upper surfaces of each material are substantially in a common plane. That is, the extra gap 120 and the extra shield 130 are planarized so that a common surface is provided for later deposition of the first gap 140 and sensor layer 150. The thicknesses of the extra gap 120 and the extra shield 130 can be reduced by any of a variety of well known methods, however it is preferred that a chemical mechanical process (CMP) is used to polish the extra gap 120 and extra shield 130 down to a thickness of 1000 Å. Although a thickness of 1000 Å for the extra gap 120 and the extra shield 130 is desired, ten percent thicker or thinner is acceptable. The upper surface 122 of the extra gap 120 and the upper surface 132 of the extra shield 130 are defined during this step. As shown in FIG. 3e, the planarization of the present step creates the upper surfaces 122 and 132, which lie in a single common plane. Preferably, the CMP process provides a mean roughness of the upper surface 122 and upper surface 132 of no more than about 5 Å to 10 Å.

Figure 3F:
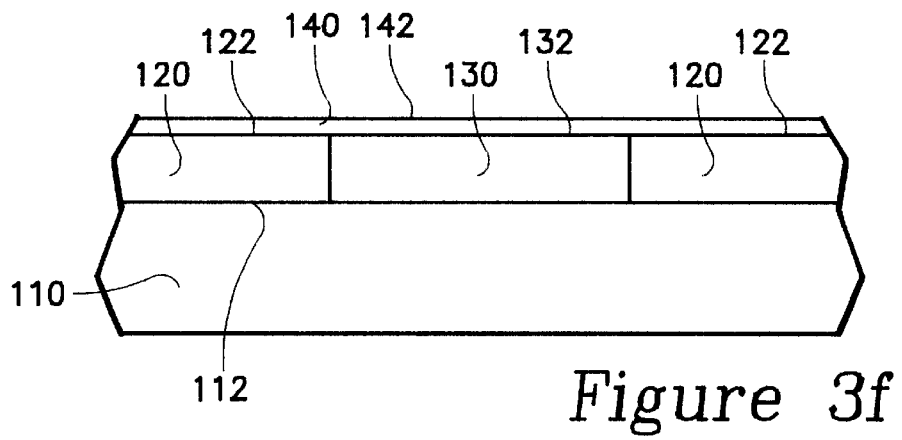

After the extra gap 120 and extra shield 130 have been deposited, the step of depositing a first gap layer 360 is performed. This step is shown in FIGS. 3f and 5. During this step, the first gap 140 is deposited over the extra gap 120 and the extra shield 130. Because the upper surfaces 122 and 132 are in a common plane, the first gap 140 lies flat with a planer upper surface 142, as shown in FIG. 3f. The first gap 140 is deposited to enough of a thickness to provide sufficient insulation against shorting between the sensor layer 150 and the extra shield 130. However, the thickness of the first gap 140 is limited to allow the desired head areal density to be achieved. The preferred range of thicknesses of the first gap is between 300 Å–700 Å. The first gap 140 can be deposited by any of a variety of known methods including spinning on the material and sputter deposition.

Figure 3G:
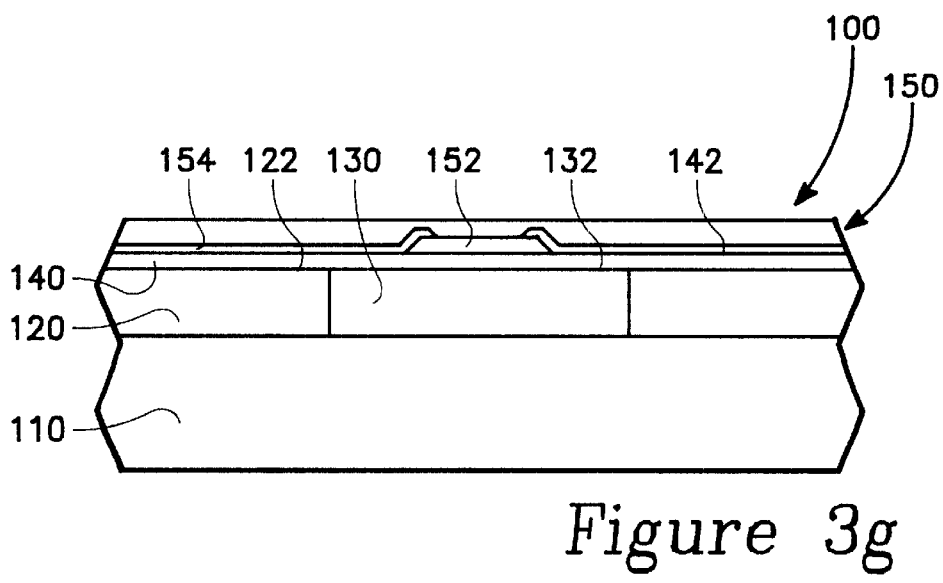

Lastly, the sensor layer 150 is applied in the step of depositing a sensor material layer 370. As shown in FIG. 3g, by being applied to the flat (planar) upper surface 142 of the first gap 140, the sensor layer 150 is also flat. Because the sensor layer 150 is provided with a flat surface to be deposited upon, the sensor layer 150 does not have to conform to a cavity shape, as was the case in prior art devices. As such, the width of the sensor element 152 is not subject to variations in the width and depth of a cavity. As noted above, the sensor layer can be any of a variety of types. The specific material, layering and thickness of the sensor layer 150 is dependent upon the type of sensor layer which is to be used. For example, a CIP sensor layer can be layered (from the bottom) with a antiferromagnet (AFM) layer, a pinned layer, an intermediate layer, a sensing layer and lead layers connected over and to the edges of the sensing layer.

While the preferred embodiments of the present invention have been described in detail above, many changes to these embodiments may be made without departing from the true scope and teachings of the present invention. The present invention, therefore, is limited only as claimed below and the equivalents thereof.

What is claimed is:

1. A read sensor comprising:
   a) a shield;
   b) a sensor element;
   c) an extra shield between the shield and the sensor element;
   d) an extra gap between the shield and the sensor element and adjacent the extra shield; and
   e) a gap layer between the sensor element and the extra shield.

2. The read sensor of claim 1, wherein the sensor element is in a substantially planar sensor layer.

3. The read sensor of claim 2, wherein the extra shield has an extra shield upper surface adjacent to the gap layer, wherein the extra gap has an extra gap upper surface adjacent to the gap layer, and wherein the extra shield upper surface and the extra gap upper surface are substantially flat and substantially aligned.

4. The read sensor of claim 2, wherein the extra shield has an extra shield upper surface adjacent to the gap layer, wherein the extra gap has an extra gap upper surface adjacent to the gap layer, and wherein the extra shield upper surface and the extra gap upper surface lie substantially in a common plane.

5. The read sensor of claim 4, wherein the gap layer is substantially planar.

6. The read sensor of claim 5, wherein the extra gap is positioned lateral to the sensor element and the extra shield is adjacent to the sensor element.

7. The read sensor of claim 6, wherein the extra gap is positioned about the extra shield.

8. The read sensor of claim 7, wherein extra shield is wider than the sensor element.

9. The read sensor of claim 8, wherein the shield and the extra shield comprise a plated nickel iron, and wherein the extra gap and the gap layer comprise alumina.

10. The read sensor of claim 9, wherein the extra shield is a layer with a thickness of about 1000 Å and the extra gap is a layer with a thickness of about 1000 Å.

11. The read sensor of claim 10, wherein the gap layer is between about 300 Å thick and about 700 Å thick.

12. The read sensor of claim 9, wherein the shield has a shield upper surface adjacent to the extra gap, wherein the shield upper surface is sufficiently rough to substantially prevent delamination of the extra gap from the shield.

13. A data storage and retrieval apparatus comprsing:
   a) a magnetic recording media;
   b) a head assembly positioned adjacent the magnetic recording media comprising:
      (i) a write head; and
      (ii) a read head comprising:
         1) a shield;
         2) a sensor element;
         3) an extra shield between the shield and the sensor element;
         4) an extra gap between the shield and the sensor element and adjacent the extra shield; and
         5) a gap layer between the sensor element and the extra shield;
   c) a motor coupled to the media so as to move the media with respect to the head assembly.

14. The data storage and retrieval apparatus of claim 13, wherein the sensor element is positioned within a substantially planar sensor layer.

15. The data storage and retrieval apparatus of claim 14, wherein the gap layer is substantially planar, and wherein the extra shield has an extra shield upper surface adjacent to the gap layer, wherein the extra gap has an extra gap upper surface adjacent to the gap layer, and wherein the extra shield upper surface and the extra gap upper surface are substantially coplanar.

16. The data storage and retrieval apparatus of claim 15, wherein the gap layer comprises alumina between about 300 Å and 700 Å thick, wherein the extra gap comprises alumina about 1000 Å thick, wherein the shield comprises nickel iron, and wherein the extra shield comprises alumina about 1000 Å thick.

* * * * *